United States Patent [19]

Mills et al.

[11] Patent Number: 5,314,397
[45] Date of Patent: May 24, 1994

[54] POSITIONING APPARATUS FOR MULTIPLE-SPINDLE MACHINING

[75] Inventors: Daniel M. Mills, Riverview; Richard Ogletree, Southfield, both of Mich.; Thomas J. Lindem, Rockford, Ill.

[73] Assignee: Ford Motor Company, Dearborn, Mich.

[21] Appl. No.: 923,436

[22] Filed: Jul. 31, 1992

[51] Int. Cl.$^5$ ............................................ B23Q 3/157
[52] U.S. Cl. ..................................... 483/30; 29/26 A; 408/234; 409/202; 409/212; 483/15
[58] Field of Search .................. 483/20, 30, 36, 14, 483/15, 5, 41; 408/237, 234, 31, 42; 409/202, 212, 235, 204, 191, 190; 33/1 M; 29/26 A, 33 P, 564, 560; 219/121.78

[56] References Cited

U.S. PATENT DOCUMENTS

| Re. 31,288 | 6/1983  | Matsuzaki et al. | 29/27 C    |
|------------|---------|------------------|------------|
| 1,878,707  | 9/1932  | Johnson          | 409/212    |
| 4,102,035  | 7/1978  | Voglrieder et al.| 483/56     |
| 4,359,814  | 11/1982 | Pihery et al.    | 29/27 C    |
| 4,392,642  | 7/1983  | Chitayat         | 269/73     |
| 4,505,464  | 3/1985  | Chitayat         | 269/73     |
| 4,571,799  | 2/1986  | Chitayat         | 29/149.5 A |
| 4,658,485  | 4/1987  | Yang             | 409/202 X  |
| 4,761,876  | 8/1988  | Kosmowski        | 483/1      |
| 4,856,178  | 8/1989  | Salvagnini       | 483/20     |
| 4,893,398  | 1/1990  | Zimmer           | 483/14     |
| 4,951,802  | 8/1990  | Weissgerber      | 29/33 P    |
| 4,953,306  | 9/1990  | Weckenmann       | 33/1 M     |
| 4,973,819  | 11/1990 | Thatcher         | 219/121.78 |
| 4,985,651  | 1/1991  | Chitayat         | 310/12     |
| 4,987,668  | 1/1991  | Roesch           | 483/30     |
| 5,131,136  | 7/1992  | Uchida et al.    | 483/5      |
| 5,187,846  | 2/1993  | Kitamura et al.  | 29/33 P    |

FOREIGN PATENT DOCUMENTS 738786  6/1980  U.S.S.R. ............... 409/212

Primary Examiner—William Briggs
Attorney, Agent, or Firm—Joseph W. Malleck; Roger L. May

[57] ABSTRACT

Positioning apparatus for multiple-spindle machining, comprising: (a) a plurality of upstanding columns rigidly interconnected to a common platform and aligned parallel to each other and perpendicular to the platform within an accuracy of ±0.0005 inches; (b) rail means extending between each of the columns along the periphery defined by the footprint of the columns for providing movable support and having bearing means on the columns providing for movement of each rail means along the Y-axis; (c) other movement means slidable on each of the rail means along at least another axis of movement; (d) linear motor means for selectively moving the rail means and other movement means along said respective Y and another axis at peak accelerations or decelerations of about 1-2 G's; and (d) spindle means on each ram having a spindle rotationally driven about an S-axis thereof.

18 Claims, 6 Drawing Sheets

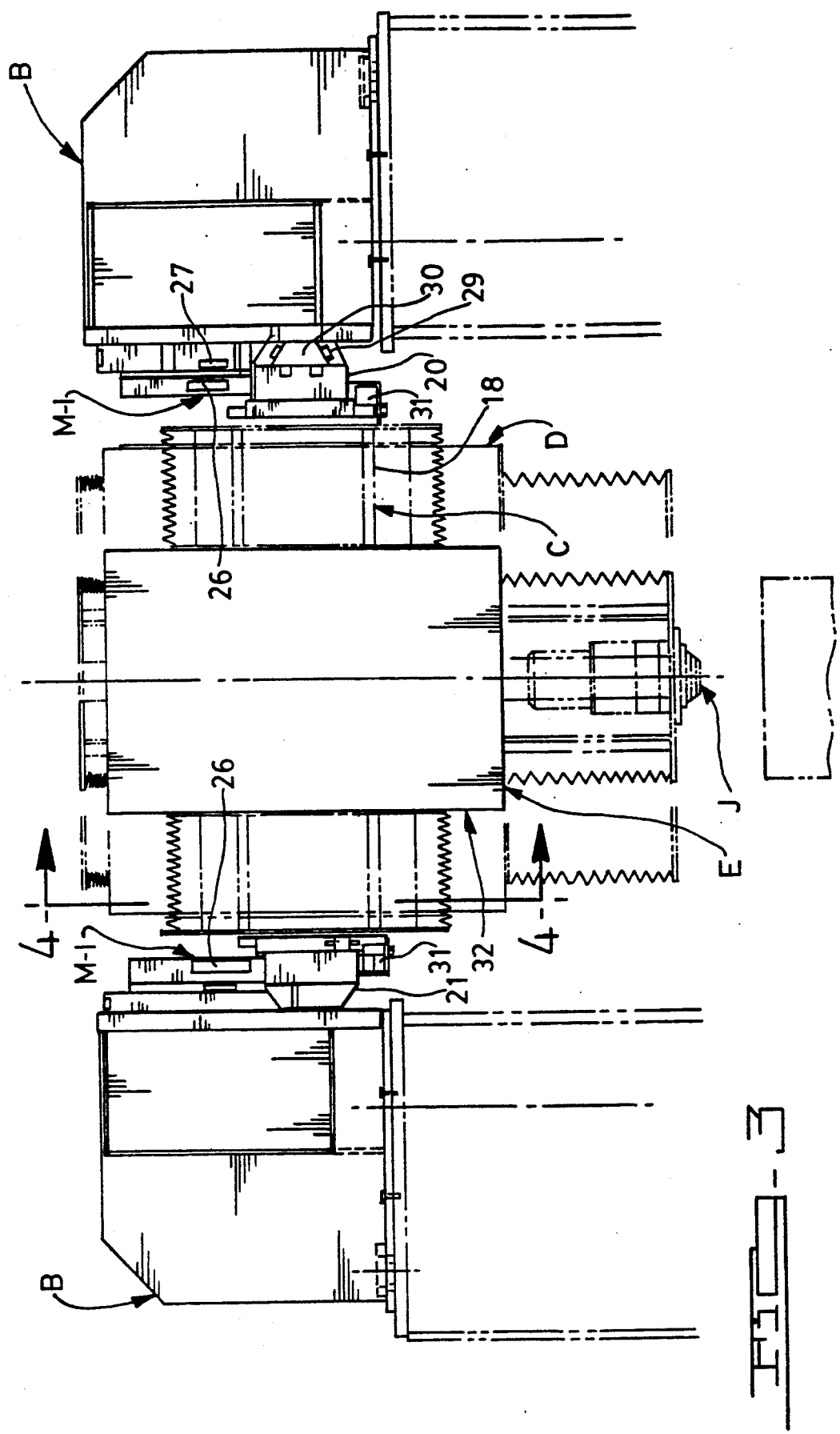

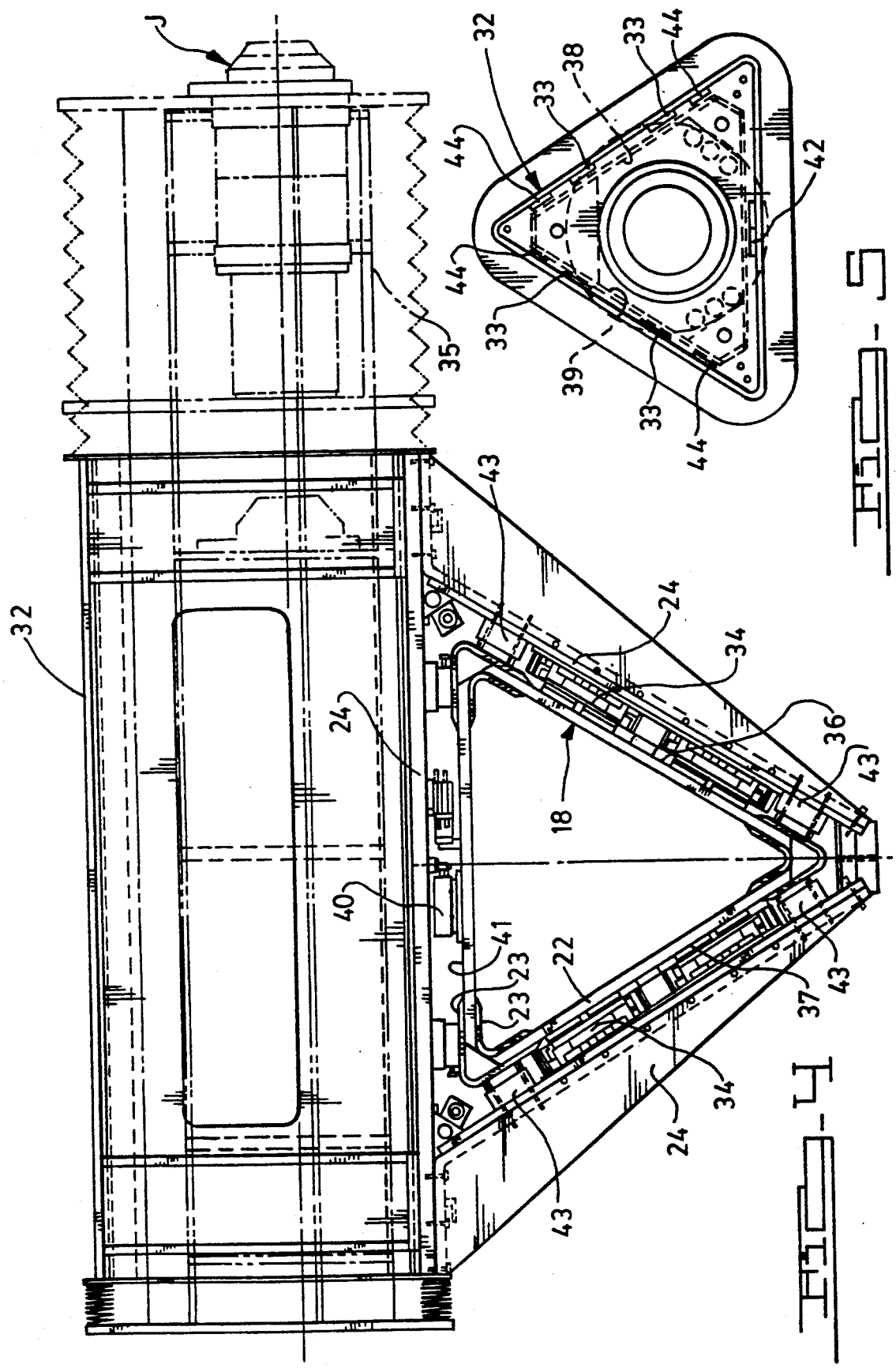

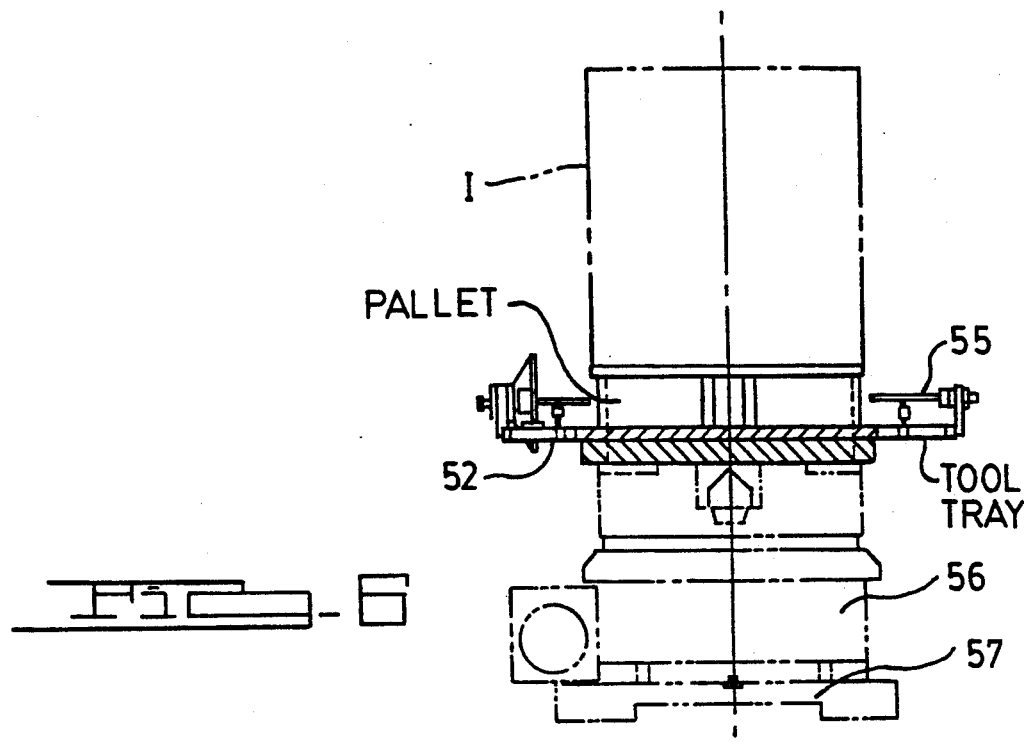
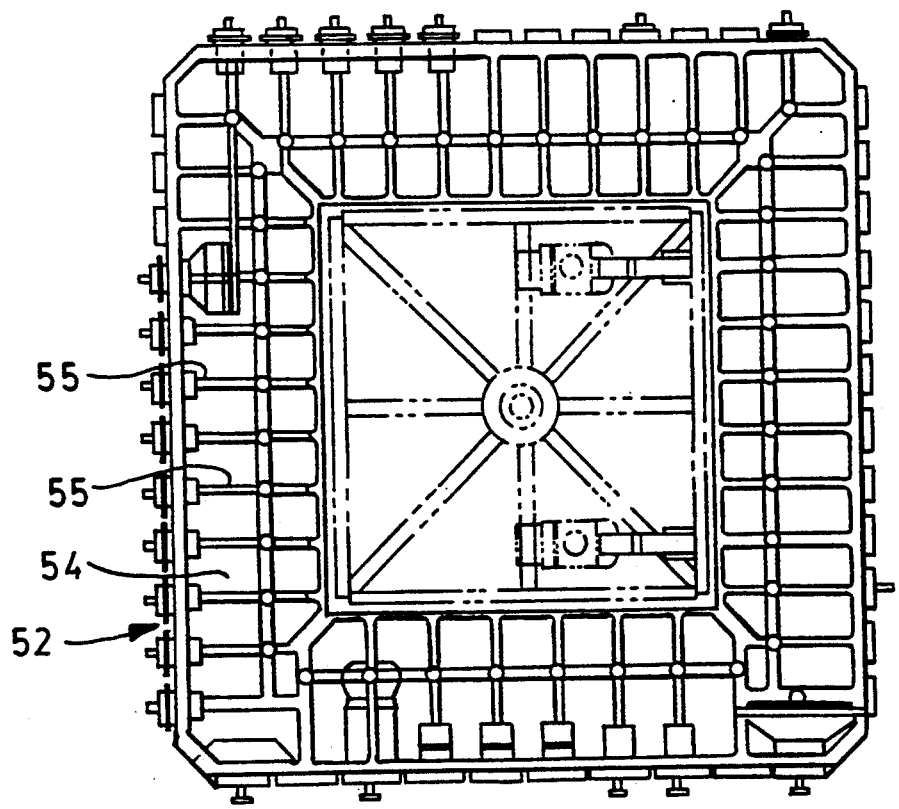
FIG-7

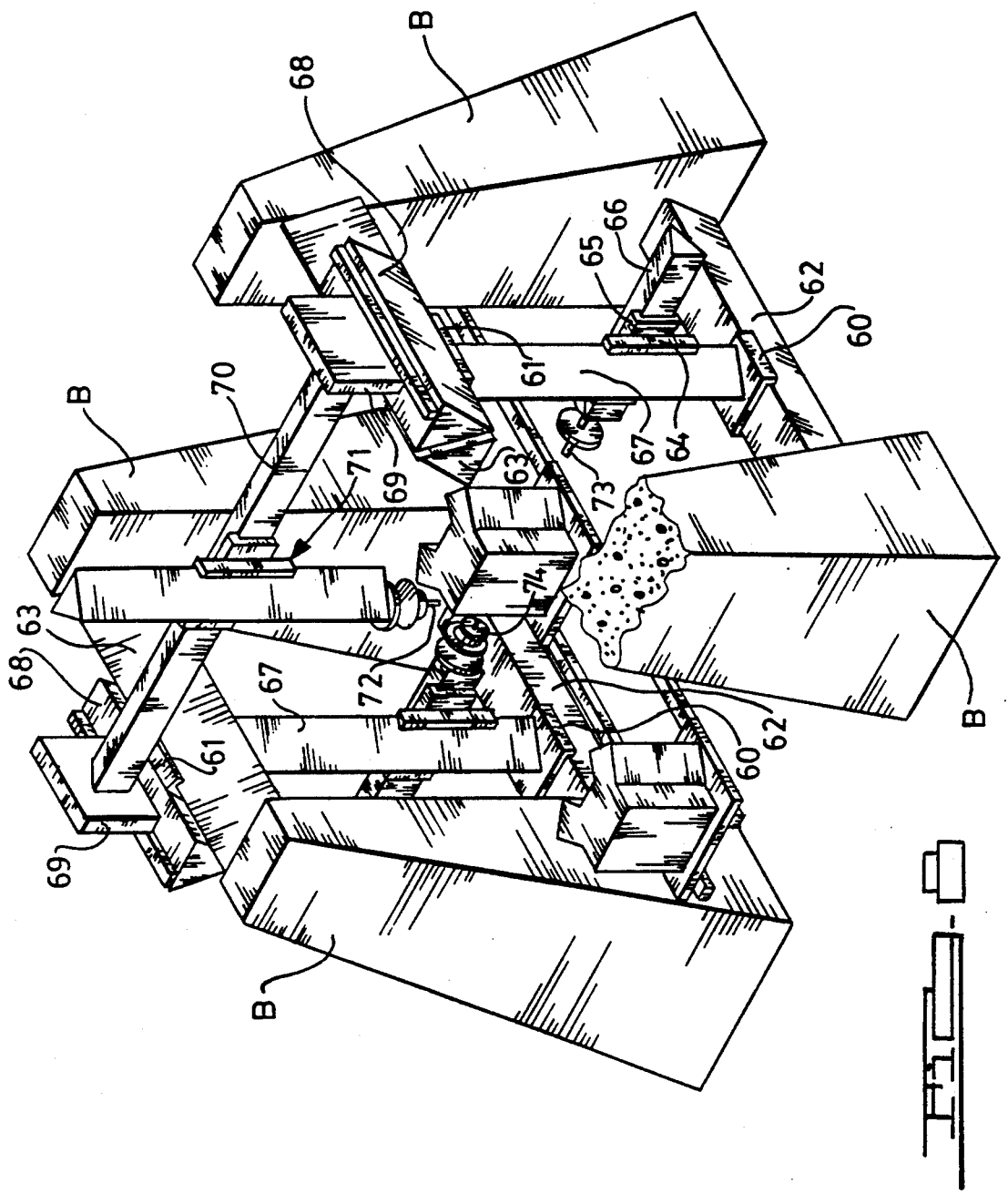

POSITIONING APPARATUS FOR MULTIPLE-SPINDLE MACHINING

BACKGROUND OF THE INVENTION

1. Technical Field

The invention relates to positioning assemblies using electrical linear motors and, more particularly, to such assemblies that accelerate and decelerate a movable working element at a rate approaching or exceeding one G.

2. Discussion of the Prior Art

Improving such positioning assemblies requires breaking the productivity barrier in machining a variety of surfaces and configurations on a given workpiece without dedicated tooling clusters, and to do so with more than one cutting tool that is independently positioned but simultaneously controlled. High-volume prior art machining lines, providing 500,000 machined units per year, or more, of one type, are not economical if marketing demand for such workpiece drops. Such lines may use multiple-spindle turret heads which are costly to change when modifying the line to machine other workpieces, and are limited to only one of either drilling, boring, or milling.

Such problem can be overcome by use of multiple-spindle machines having positioning accelerations many times faster than commercial machining cells. A high degree of flexibility can be achieved by eliminating product-specific worktables, dedicated cutting heads requiring replacement when workpiece changes are made, and utilizing unprecedented speeds not only to complete machining tasks but to change tools or fixtures from an adjacent inventory. Timing for changing to a new product (workpiece) can be substantially reduced, requiring only software control modifications.

However, increased positioning accelerations or decelerations require strong thrust forces that detract from accurate positioning. Maintaining accurate dimensional alignment of a plurality of spindles is complicated by such forces. Reducing the multiple mass while maintaining stiffness in the relatively movable mass remains an associated problem to successfully and accurately position tooling at such unprecedented rates.

The prior art has confined the use of linear motors to positioning small lightweight tools on granite bases or on rigidly-tied tandem axes (axes which are separated transverse to their own extent) (see U.S. Pat. Nos. 4,102,035 and 4,359,814). Little distortion of the supporting structure will be experienced with these devices, allowing use of bearings which contribute little to stiffness, such as air bearings and magnetic loading of mechanical bearings (see U.S. Pat. Nos. 4,392,642; 4,571,799; 4,985,651; and 4,761,876). Air bearings are undesirable because they require special support and guide surfaces that cannot be maintained in a heavy-duty, mass-machining environment for automotive component making, and are undesirable because they are insufficiently dimensionally stiff when deployed to move large tooling at high accelerations or decelerations.

Magnetic loading to increase guidance of a linear motor assembly has been used in conjunction with sliding or roller bearings (see U.S. Pat. Nos. 4,505,464 and 4,985,651). Magnetic loading of bearings does little to enhance stiffness because it is imprecise and weak; magnetic loading is primarily suited to a use that assists in following more closely a guided track and therefore does little to promote stiffness of the linear motor assembly.

SUMMARY OF THE INVENTION

The invention, in a first aspect, is a positioning apparatus for multiple-spindle machining. The apparatus comprises: (a) a plurality of upstanding columns rigidly interconnected to a common platform and aligned parallel to each other and perpendicular to the platform within an accuracy of ±0.0005 inches; (b) rail means extending between each of the columns along the periphery defined by the footprint of the columns for providing movable support and having bearing means on the columns providing for movement of each rail means along the Y-axis; (c) other movement means slidable on each of the rail means along at least another axis of movement; (d) linear motor means for selectively moving the rail means and other movement means along said respective Y and another axis at peak accelerations or decelerations of about 1-2 G's; and (d) spindle means on each ram having a spindle rotationally driven about an S-axis thereof. Each of the plurality of spindles is rapidly positioned to enter a cubed machining space through a different exposed side of such space.

In another aspect, the invention is a method of machining simultaneously a sequence of surfaces on each of multiple sides of a workpiece, comprising: (a) supporting a plurality of rotary-driven spindles, each carrying a cutting tool, each spindle being supported by a plurality of relatively movable elements that provide for movement into and out of a predetermined sized, cubed machining space, such support providing for spindle movement having vectors along at least mutually perpendicular axes; (b) placing the workpiece in the machining space at a predetermined location; (c) actuating relative movement of the elements by use of linear motors to accurately position each spindle for simultaneous machining of first surfaces on separate sides of the workpiece; and (d) actuating the elements by use of said linear motors to reposition the plurality of spindles for simultaneous machining of other surfaces on each of the sides of the workpiece

BRIEF DESCRIPTION OF THE DRAWINGS

FIG. 3 is an enlarged plan view of one of the horizontally oriented spindles and its rail and saddle assembly;

FIG. 4 is a sectional view taken substantially along lines 4—4 of FIG. 3;

FIG. 5 is an end view of the structure in FIG. 4;

FIG. 6 is an elevational view of the worktable assembly and tool changing mechanism;

FIG. 7 is a plan view of the structure of FIG. 6; and

FIG. 8 is an alternative embodiment of this invention showing a three-spindle machining apparatus using tandem X-axis movement assemblies for certain of the spindles.

DETAILED DESCRIPTION AND BEST MODE

The basic elements and architecture of the multiple-spindle positioning apparatus 10 of this invention for carrying out machining are shown in FIGS. 1-4. Such apparatus comprises a plurality of columns B; rails assemblies C (here four in number: C-1 through C-4), stationed between columns and movable along a Y-axis; saddle assembly D on each rail assembly movable along an X-axis; ram assembly E on each said saddle assembly D (carrying a spindle F, rotational about an S-axis, to enter each upright side of a cubed machining space I); a superstructure G laying across the columns and supporting a flexible assembly H movable in X and Z axes and about an A axis to enter and carry a spindle J through the top side of the machining space I; linear motor assemblies M for selectively moving the assemblies C, D, E, and H to position and feed the spindles F and J; adjustable and movable workpiece support K and tool inventory L for the vertical spindle J and a tool inventory N for horizontal spindles F.

Figure 1:
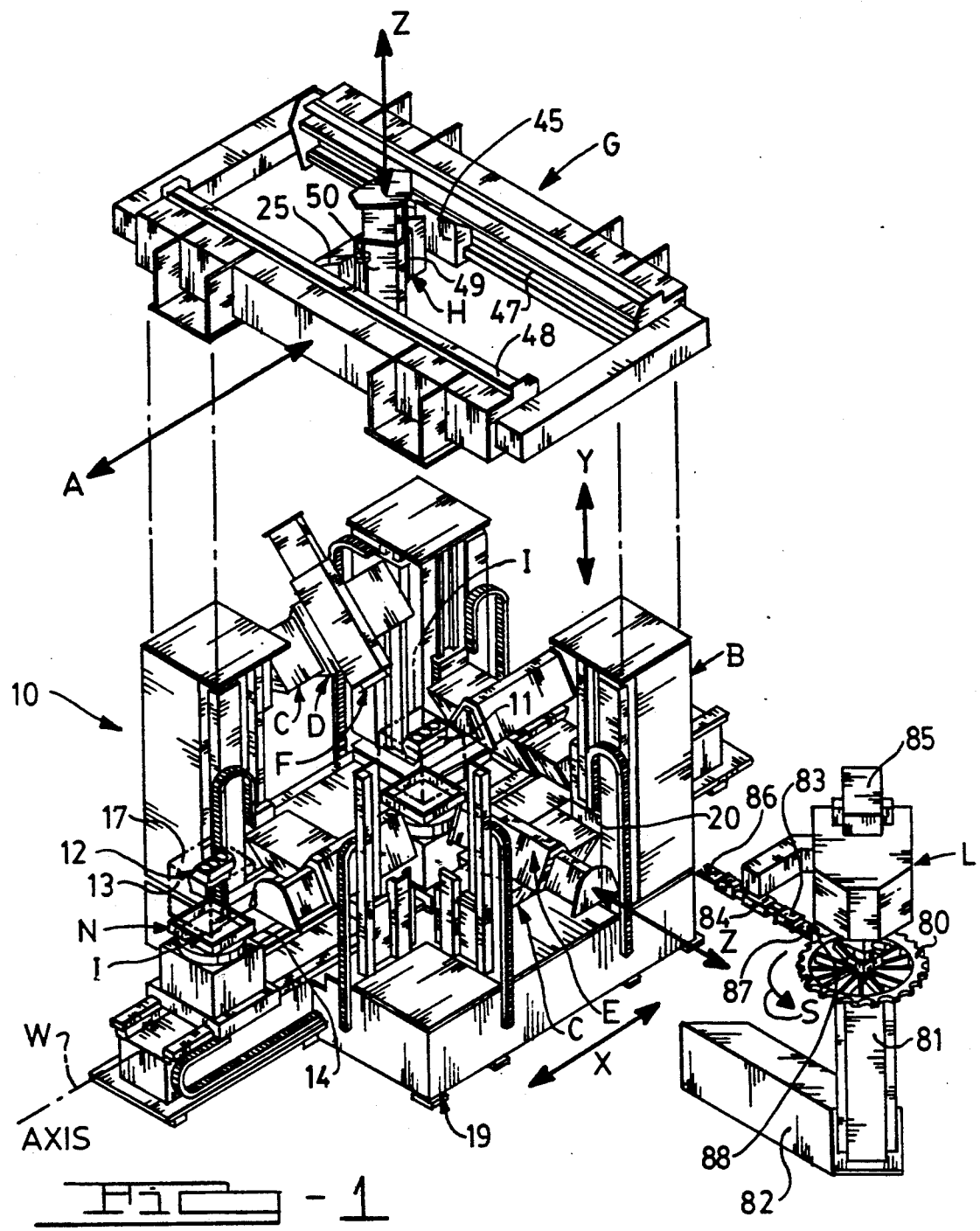
FIG. 1 is an overall perspective view of the machining apparatus of this invention showing the top superstructure in spaced relationship.
Figure 2:
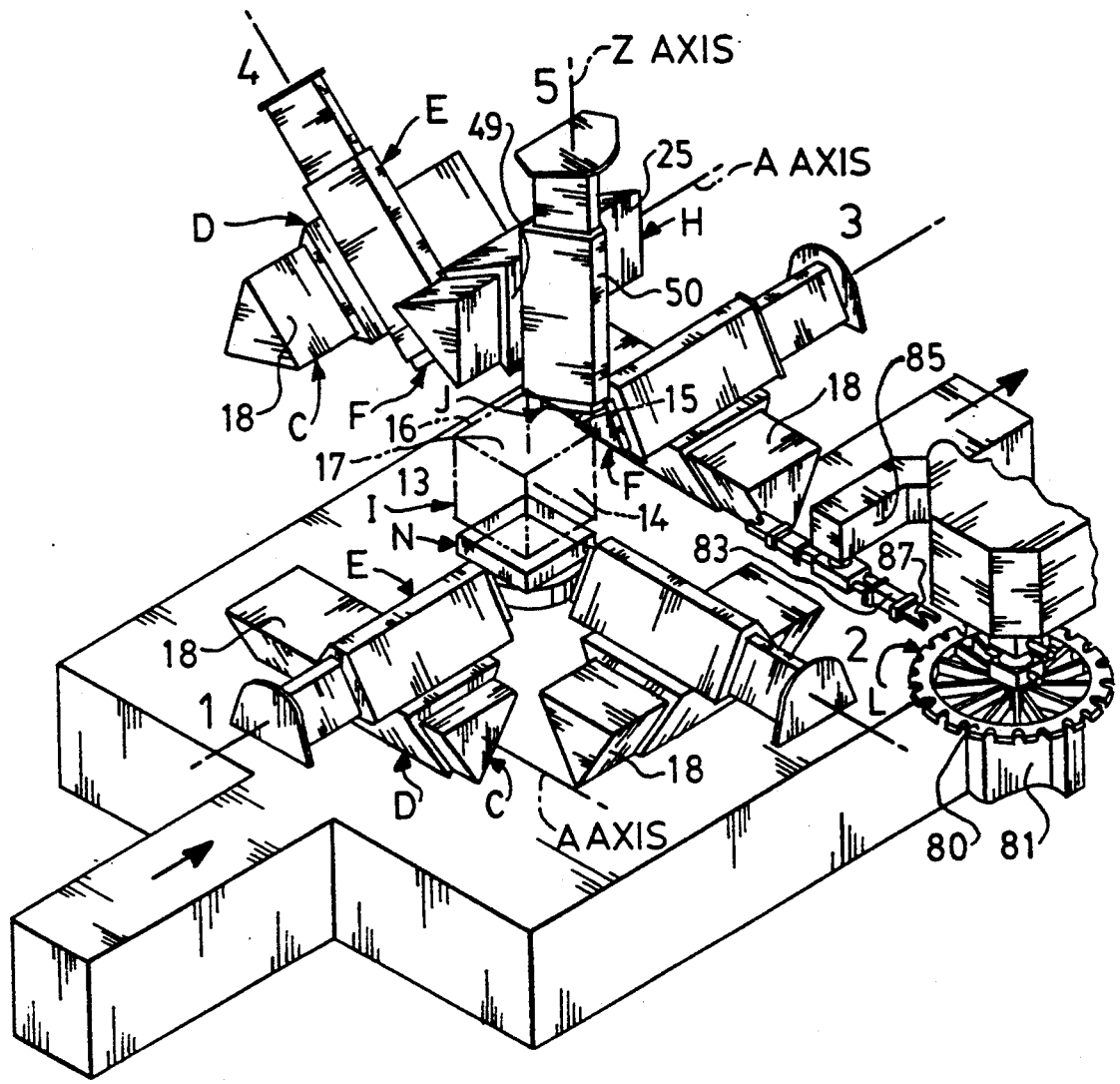
FIG. 2 is a simplified perspective view of the structure in FIG. 1.

It is important to note that the apparatus in FIG. 1 has five spindles: four horizontally oriented spindles (1–4) arranged to independently enter an upright side of the cubed machining space I, and one vertically oriented spindle (5) arranged to independently enter the top of the cubed machining space I. The apparatus is capable of simultaneously rapidly and accurately positioning each of such spindles within such space at accelerations/decelerations of about 1-2 G's. The apparatus is also capable of simultaneously or selectively moving the spindles at slower feed rates to carry out machining of faces 11 of the workpiece 12 aligned or juxtaposed with each of the various sides 13, 14, 15, 16, and 17 of the machining space. The spindles F and J can be repositioned individually and concurrently to carry out machining of sequential tasks along the respective workpiece faces 11 associated with a spindle. Moreover, the spindles can be extremely rapidly withdrawn from the cubed machining space I to carry out a quick tool exchange with apparatus L or N within a timespan of about less than about four seconds.

Such plurality of spindles may be less than five, such as shown in the alternative embodiment in FIG. 8, or more than five spindles. The latter variation increases the difficulty of placing independently movable support means for each of such spindles within a given envelope surrounding the machining space.

The four columns B for the machine are heavy-duty steel weldments, although any rigid and vibration-absorbing construction may be utilized; they should be aligned to ±0.0005 inch. These columns are supported on precision leveling devices 19 that are located on the machine foundation. These columns support all movable assemblies C, D, E, and H; due to the massive nature of such columns, deflections are reduced. The leveling devices under the columns allow the columns to be aligned to each other, and the Y-axis slideways can be realigned on the columns.

Each rail assembly has a beam or rail 18 extending between the columns, along the column footprint periphery, and is carried by two Y-axis slides 20, 21 (see FIG. 3). Each beam 18 is constructed of high-strength graphite composite material in a triangular cross-sectional configuration (see FIG. 4), bulkheads 22 are configured as honeycomb cells faced with composite material cloth 23, and the saddle 24 has outside panels of solid graphite composite material. The graphite composite preferably should have its graphite fibers arranged to give homogeneous orientation. The beam 25, used to support the upper spindle J is the same in construction as the beams used for the horizontal spindles except that it is shorter.

Each beam may be provided with a rotary joint that allows the ram assembly E to pivot with respect to the work cube. A beam can be rotated by dual A-axis drive motors, one located on each end of the beam; the drive motors would turn a worm that is engaged with a worm gear mounted in the Y-axis slide. The worm gear can be carried on a pair of angular contact precision ball bearings and rotary feedback scales could be mounted on each end of the beam with the drive motors driving against one another during the final positioning of the beam to remove all of the backlash. The beam could then clamped into position by a precision face coupling; such clamping can be done on the A-axis because it is not a contouring axis.

Each Y-axis slide 20, 21 is located at each end of the beam. Each of the Y-axis slides 20, 21 are constructed as a high-strength aluminum casting and each slide is carried on roller bearings 29. These bearings run on a dovetail way surface 30 that is adjustable on the column to allow for realignment of the way surface if it is ever required. The slides are powered by linear motors M-1 with coils 26 mounted on the Y-axis slide. Magnets 27 for the motor are located on the column. A linear inductosyn scale 28 for the Y-axis slide is located between the motor and the guideway. Each beam is counterbalanced by two air cylinders 31, and each slide is also equipped with a brake that will keep the slide from falling when power is removed from the slide. The slides are independent linear motor actuated and provide the required high acceleration/deceleration and velocity characteristics. The software of the controller, as shown in FIG. 9, for the linear motor is designed to prevent skewing of each of the beams.

Each saddle assembly D has an X-axis saddle 24 uniquely wrapped around the beam cross-section. The saddle is constructed of high-strength graphite composite panel material; the panels are mechanically joined at their intersection for ease of maintenance and enhanced stiffness. The saddle assembly also has a tunnel 32 securely sitting on the saddle, also of graphite composite material. The linear motors 33 and 34 that power the ram 35 and the saddle 24 respectively are carried on the saddle assembly D. The motors 34 are symmetrically located on two sides 36 and 37 of the triangular beam 18 and on two sides 38, 39 of the triangular tunnel 32 that supports the saddle on the beam. A linear feedback scale 40 (Inductsyn) for the saddle is centrally located on the third side 41 of the beam 18 and a feedback scale 42 is located in a similar manner on the interior of tunnel 32. The saddle 24 carries hydrostatic bearings 43 that support the saddle on the beam 18 and also carries hydrostatic bearings 44 on the tunnel to support the ram 35 therein.

The ram assembly E has a ram 35 fabricated of high-strength graphite composite material with outside panels of solid composite and the intermediate bulkheads as a honeycomb material faced with composite cloth. The magnets 45 for the linear motors 33 are symmetrically placed on two of the surfaces of the ram triangular structure. The Z-axis ram 35 carries the machine spindle. The linear feedback scale 42 for the ram is mounted at the third side of the ram. This provides a centrally located feedback device that is in line with the spindle and the motors.

The superstructure G is constructed of heavy-duty steel fabrication and rigidly supported by the four columns. X-axis slides 45 for the flex assembly H move in a horizontal direction and connect opposite ends of the rail 25 to rigid ways 47, 48. The slides have roller bearings to carry the rial on the ways. The saddle 49 and tunnel 50 are similar to those used on the other assemblies except that saddle provides for A-axis movement and the tunnel Z-axis movement. All of the previously stated features apply to the upper flexible assembly.

The tool inventory or changer L for the vertically oriented spindle J, as shown in FIG. 1, consists of a rotating tool magazine 80 supported for rotation on a column 81 and bore 82; a change arm 83 is supported at 84 by head structure 85 for reversible 180° rotation movements. Grippers 86 and 87 at opposite ends of the arm 83 are actuatable to grab a tool from magazine 80 at station 88. The arm 83 is rotated 180° and presents the tool for transfer to spindle J which is lowered to align with the tool and mechanically connect by insertion into the tool holder.

The tool inventory or changer N for the horizontally disposed spindles F is provided as a free-standing tray structure and is not physically connected to the machine (see FIGS. 6 and 7). It is designed to provide easy operator access to the 24-tool magazine 52 from floor level. The tool magazine is set at an elevation suitable to the required level for tool changing and access by the head of a spindle F. No tool change arm is necessary to reach the tool magazine 52; the spindles F are positioned to be inserted into the holder of a tool 55 as it sits in the magazine pocket 54. The tool search and replacement of the tool in the magazine is internal to the machining cycle. The result is that the only part of the tool change cycle that is part of the machining cycle is the removal of a tool 55 from the spindle by insertion of the spindle into the tool holder and withdrawal of the spindle from the magazine. The estimated time for tool change, chip-to-chip, is about 10.3 seconds.

A cell worktable 56 is centrally located inside of the machining cell 10. It is mounted on the W-axis slide 57 and has a travel of about 12 inches in both perpendicular directions from the center of the cell. This does not require the worktable to leave the slide and only requires one table per cell. The worktable has a coupling which allows- it to be adjustable in horizontally rotational increments of one-half degree.

A modification of the design of the machining cell 10 is the concept of carrying all of the tools 55 required for a particular operation on a pallet that is transferred onto the worktable with the fixtured workpiece 59. The pallet fits onto the worktable in a drawer-type design that also is the mechanism for clamping the pallet to the worktable. The pallet is spring-clamped and power-unclamped to ensure clamping of the pallet if there is a loss of power. The pallet is located on the top of the worktable by at least three pins. Two of the pins are pallet locators and the third pin is to crowd the pallet into the same location on the locator pins before it is clamped. This allows each tool tray to be custom designed for tools that are required for one side of the workpiece. The tools rotate on the worktable with the workpiece. Since the tools are carried on the pallet, there is no need to have a tool changer for the horizontal spindles. The tools are changed by positioning the spindle in front of the required tool, clamping the tool onto the spindle, and moving the spindle in the vertical direction to lift the tool out of the tool support. The tool is returned to the tool support in the same manner. The result is a fast tool change without a tool changer. The estimated time for a tool change, chip-to-chip, is 5.7 seconds.

As shown in FIG. 1, the transfer concept for such modification is to move the pallet through the machine, in one side and out the other. This allows the pallet to be transferred from an unclamped station (on a low-cost cell automation) to the fixture unload area. The pallet may be placed on a transfer car outside the machining cell and transferred into the cell on rails. The transfer may also be powered by ball screw drivers or by electric linear motors. The change transfer mechanism is located on the top of the car and, when the car is in position, the pallet is raised to match the worktable, transferred onto the worktable, and then clamped on the table as previously described. The pallets are removed from the worktable in the reverse steps that are described above. Pallet transfer may take approximately 20 seconds.

A feature of this invention is the use of tandem coordinated slides for raising or moving a rail. An alternative embodiment, shown in FIG. 8, uses tandem slides 60, 61, but operating with tandem rails 62, 63 extending between concrete columns B; the embodiment of FIG. 8 also limits the multiple of spindles to three. The bearing and linear motor interface construction between the slides 60, 61 and rails 62, 63 can be the same as described for the preferred embodiment. The saddle 64, tunnel 65, and ram 66 construction is also similar to that of the preferred embodiment except that (i) the saddle 64 rides on an upright beam 67 extending between and supported by the slides 61, 62; and (ii) the motors and scales are arranged along one surface or face of the rails 62, 63 or ram 66. Ram 66 carry horizontally oriented spindles 73, 74. Coupled to each of the upper slides 61 is a stub rail 68 upon which is mounted a pair of slides 69 for supporting a horizontal rail 70 which in turn is used to carry a movable assembly 71 havng a vertically oriented spindle 72. Suitable bearing and linear motor actuating apparatus is deployed between slides 69 and rail 68.

The construction and control of suitable linear motors useful for completing this invention is disclosed in U.S application Ser. No. 07/924692, commonly assigned to the assignee of this invention, an the disclosure of which is incorporated herein by reference.

The method of this invention for simultaneously machining a sequence of surface on each of multiple sides of a workpiece, comprises: (a) supporting a plurality of rotary-driven spindles, each carrying a cutting tool, each spindle being supported by a plurality of relatively movable elements that provide for movement into and out of a predetermined sized, cubed machining space, such support providing for spindle movement having vectors along at least mutually perpendicular axes; (b) placing said workpiece in said machining space at a predetermined location; (c) actuating relative movement of said elements by use of linear motors to accurately position each spindle for simultaneous machining of first surfaces on each side of said workpiece; and (d) actuating said elements by use of said linear motors to reposition said plurality of spindles for simultaneously machining other surfaces on each side of said workpiece.

We claim:

1. Positioning apparatus for multiple-spindle machining within a predetermined machine space, comprising:
    (a) at least three upstanding columns rigidly interconnected to a common platform and aligned substantially parallel to each other and substantially perpendicular to said platform within an accuracy of ±0.0005 inches;
(b) rail means extending between each of said columns along the periphery defined by the footprint of said columns for providing movable support and having bearing means providing for movability of each rail means along a Y-axis;
(c) other movement means slidable on each of said rail means along at least another axis of movement;
(d) linear motor means for selectively moving said rail means between locations along said y axis and for selectively moving said other movement means along said another axis at peak accelerations or decelerations of about 1-2 G's; and
(e) spindle means supported on each said other movement means and having a spindle rotationally driven about an adjustable S-axis.

2. The apparatus as in claim 1, in which said other movement means comprises (i) saddle means having a saddle slidable on each rail means along an X-axis of movement and (ii) ram means on said saddle for sliding a ram along a Z-axis.

3. The apparatus as in claim 2, in which said rail means, saddle means, and ram means are formed of a material selected from the group of lightweight metal and graphite composite.

4. The apparatus as in claim 3, in which said graphite composite is formed with fibers oriented in all directions as a homogeneous material.

5. The apparatus as in claim 1, in which at least one rail means extending between a pair of columns is comprised of interconnected tandem rails slidable along and in unison between said pair of columns.

6. The apparatus as in claim 1, in which said other movement means further comprises means for selectively rotating one or more rails means about a rotational axis and for locking said rails means in said rotated condition.

7. The apparatus as in claim 1, in which said spindle means comprises first and second spindles, and said apparatus further comprises a rigid superstructure laying across said columns and an additional movement means for positioning said second spindle while said other movement means supports said first spindle.

8. The apparatus as in claim 2, in which each rail means comprises a beam having a three or four-sided cross-sectional configuration and said saddle overlaps or envelopes at least three of the sides of said rail.

9. The apparatus as in claim 8, in which said linear motor means is disposed between said saddles and at least two sides of said triangular cross-sectioned rails.

10. The apparatus as in claim 1, which further comprises means for automatically exchanging tools on at least one of said spindles, said tool exchanging means being substantially horizontally aligned with said machining space.

11. Positioning apparatus for large mass multiple-spindle machining, comprising:
(a) at least three upstanding columns rigidly interconnected to a common platform for accurate alignment both parallel to each other and perpendicular to said platform;
(b) rail means extending between each of said columns along the periphery defined by the footprint of said columns for providing movability of each rail means along a Y-axis;
(c) other movement means slidable on each of said rail means along at least another axis of movement;
(d) linear motor means for selectively moving said rail means between locations along said Y-axis and for selectively moving said other movement means along said another axis at peak accelerations or decelerations of about 1-2 G's; and
(e) means supported on each of said other movement means and having a spindle rotationally driven about an S-axis independent of said another axis.

12. The apparatus as in claim 2, in which said columns have complementary pairs of oppositely facing grooves and said bearing means of said rail means is disposed to engage the sides of said grooves.

13. The apparatus as in claim 2, in which said ram means has a multi-sided ram fitting within complementary sides of said saddle and has bearings between at least two sides of said ram and said saddle.

14. The apparatus as in claim 1, in which said bearings for said rail means are hydrostatic.

15. The apparatus as in claim 14, in which said columns are rigidly tied together at their tops by a superstructure, and a rapidly movable assembly for an additional spindle is carried on said superstructure.

16. The apparatus as in claim 2, in which said saddle means has hydrostatic bearings to promote a stiff freedom of movement between said rail and said saddle.

17. The apparatus as in claim 1, in which at least one of said spindles has cooling means for bathing a tool driven by said spindles, said bearing means are hydrostatic having a supply of pressurized fluid that is fed commonly to both said hydrostatic bearings and said cooling means.

18. The apparatus as in claim 15, in which said apparatus has five-axes of machining effective to machine a workpiece simultaneously on five sides thereof.

* * * * *